US010261493B2

(12) United States Patent
Hillberg et al.

(10) Patent No.: US 10,261,493 B2
(45) Date of Patent: Apr. 16, 2019

(54) METHOD FOR AUTOMATIC POSITIONING OF LAMPS IN A GREENHOUSE ENVIRONMENT (71) Applicant: HELIOSPECTRA AB, Göteborg (SE)

(72) Inventors: Staffan Hillberg, Mölndal (SE); Kirk Clendinning, Jörlanda (SE); Anthony Gilley, Hisings-Kärra (SE); Timo Pohjanvouri, Hovås (SE)

(73) Assignee: HELIOSPECTRA AB, Gothenburg (SE)

( * ) Notice: Subject to any disclaimer, the term of this patent is extended or adjusted under 35 U.S.C. 154(b) by 294 days.

(21) Appl. No.: 15/127,611

(22) PCT Filed: Mar. 24, 2015

(86) PCT No.: PCT/EP2015/056185
§ 371 (c)(1),
(2) Date: Sep. 20, 2016

(87) PCT Pub. No.: WO2015/144660
PCT Pub. Date: Oct. 1, 2015

(65) Prior Publication Data
US 2018/0173191 A1 Jun. 21, 2018

(30) Foreign Application Priority Data
Mar. 24, 2014 (EP) .................. 14161251

(51) Int. Cl.
H05B 33/08 (2006.01)
H05B 37/02 (2006.01)
(Continued)

(52) U.S. Cl.
CPC ............. *G05B 19/402* (2013.01); *A01G 9/20* (2013.01); *G01B 11/002* (2013.01); *G01B 11/14* (2013.01);
(Continued)

(58) Field of Classification Search
None
See application file for complete search history.

(56) References Cited

U.S. PATENT DOCUMENTS

2010/0271476 A1* 10/2010 Damink ............. H05B 37/0272
348/135
2015/0201480 A1* 7/2015 Ogawa ............... H05B 37/0272
315/294

FOREIGN PATENT DOCUMENTS

EP 2 315 503 A2 4/2011
WO WO 2008/118080 A1 10/2008
(Continued)

OTHER PUBLICATIONS

International Search Report (PCT/ISA/210) dated Aug. 27, 2015, by the European Patent Office as the International Searching Authority for International Application No. PCT/EP2015/056185.
(Continued)

Primary Examiner — Dedei K Hammond
(74) Attorney, Agent, or Firm — Buchanan Ingersoll & Rooney P.C.

(57) ABSTRACT

The present invention relates to a method for determining positions of a plurality of light-emitting devices arranged in a planar grid arrangement, each light-emitting device being individually controllable and having a unique network address. The invention also relates to a corresponding system and to a computer program product.

15 Claims, 6 Drawing Sheets (51) Int. Cl.
      *A01G 9/20*       (2006.01)
      *G06K 9/20*       (2006.01)
      *G01B 11/14*       (2006.01)
      *G05B 19/402*       (2006.01)
      *G06T 7/70*       (2017.01)
      *G01B 11/00*       (2006.01)

(52) U.S. Cl.
      CPC .............. *G06K 9/2027* (2013.01); *G06T 7/70* (2017.01); *H05B 33/0845* (2013.01); *H05B 33/0857* (2013.01); *H05B 37/0245* (2013.01)

(56) References Cited

FOREIGN PATENT DOCUMENTS

WO    WO 2009/010926 A2    1/2009
WO    WO 2010/097737 A1    9/2010

OTHER PUBLICATIONS

Written Opinion (PCT/ISA/237) dated Aug. 27, 2015, by the European Patent Office as the International Searching Authority for International Application No. PCT/EP2015/056185.

\* cited by examiner

METHOD FOR AUTOMATIC POSITIONING OF LAMPS IN A GREENHOUSE ENVIRONMENT

TECHNICAL FIELD

The present invention relates to a method for determining positions of a plurality of light-emitting devices arranged in a planar grid arrangement of an artificial light arrangement arranged to control growth of a plurality of plants in a controlled environment. The invention also relates to a corresponding system and computer program product.

BACKGROUND OF THE INVENTION

Artificial and supplemental lighting in e.g. a greenhouse typically involves use of an illumination system for stimulating plant growth, the illumination system comprising a plurality of high power light sources. Different types of light sources, having different light spectrum and providing different effects on growth stimulation, may be included, such as light sources based on metal halide (MH) or high intensity discharge (HID) which includes high pressure sodium (HPS). Using metal halide based lighting typically promotes shorter, bushy growth; whereas high pressure sodium based lighting in comparison typically tend to produce taller and stretched plants.

Recently, much progress has been made in increasing the brightness of light emitting diodes (LEDs). As a result, LEDs have become sufficiently bright and inexpensive to serve also for artificial lighting in e.g. a greenhouse environment, additionally providing the possibility of emitting light with adjustable light spectrum. By mixing differently colored LEDs and adjusting their individual intensity a desired light spectrum may be obtained. An adjustable lighting system typically comprises a number of primary colors, for one example the three primaries red, green and blue. The light spectrum of the generated light is determined by the colors of the LEDs that are used, as well as by the mixing ratios of the intensity of light from LEDs of different colors. Thus, each LED of a LED based illumination system may be individually controlled such that a light spectrum of the overall emitted light may be conveniently adjusted. Furthermore, by using LEDs it is possible to decrease the energy consumption, a requirement that is well in line with the current environmental trend. Additionally, using LED based illumination system minimizes the amount of light source generated heat which is specifically suitable in an environment where temperature control is desirable. An example of an LED based illumination system is disclosed in WO2008118080, comprising a light sensor communicatively coupled to a processor, where the processor implements a control algorithm for modulating and improving plant growth and attributes by adjusting the light spectrum emitted by the illumination system.

Document WO2008118080 shows a promising approach in relation to artificial lighting in a greenhouse environment, however, it would still be desirable to further optimize the artificial lighting systems, to be able to improve the growth process of a plant, specifically improving handling and implementation of artificial lighting systems for plants arranged in a greenhouse environment. For example, in e.g. a greenhouse there may be hundreds or thousands of light-emitting devices arranged to modulate and improve the growth of plants arranged in the greenhouse. During installation of the light-emitting devices, it is cumbersome and time-consuming to keep track of which light-emitting device is mounted at what position in a grid of light-emitting devices.

SUMMARY OF THE INVENTION

According to a first aspect of the invention, the above is at least partly alleviated by a method for determining positions of a plurality of light-emitting devices arranged in a planar grid arrangement, each light-emitting device being individually controllable and having a unique network address, the method comprising the steps of:

a) providing a camera device arbitrarily located with respect to the plurality of light-emitting devices in a way that each of the light-emitting devices in a set of the plurality of light-emitting devices is distinct in a camera view captured by the camera device;

b) acquiring image data, relating to the camera view of the set of the plurality of light-emitting devices;

c) establishing a set reference in the set of light-emitting devices from the image data, wherein the set reference is related to a position of a light-emitting device in the camera view;

d) controlling a further light-emitting device having a unique network address to emit light having distinguishable properties;

e) determining a relative position of the further light-emitting device with respect to the set reference, wherein the steps b), d)-e) are repeated until a relative position of each light-emitting device in the set of light-emitting devices has been determined.

By means of the invention, the relative positions of a plurality of light-emitting devices may be determined in a grid arrangement in a facilitated manner by using image analysis of image data acquired by a camera device. Moreover, with the invention, the relative positions of the light-emitting devices in the grid arrangement are determined in an efficient way using a camera device operated by a user. In some situations it may be advantageous to also know the absolute positions of the light-emitting devices. One way to determine the absolute positions of the light-emitting devices may be to correlate the relative positions with a layout of the planar grid arrangement or having the operator manually position one or two of the light emitting devices. Furthermore, the positions of the individual light-emitting devices are useful to know during maintenance, for example, when replacement of malfunctioning light-emitting devices is needed. In such case, a position of a malfunctioning light-emitting device may easily be obtained, and/or adjacent light-emitting devices may compensate for the missing emitted light from the malfunctioning light-emitting device. Furthermore, in case of a malfunctioning light-emitting device, an error message may be received in a central application from which a physical location of the light-emitting device may also be obtained. A central application may for example be controlled by a control unit.

In a simple manner, the camera device is pointed towards a set of light-emitting devices such that each of the light-emitting devices is distinguishable in the camera view. In other words, it should be possible, from the image data, to separately identify each of the light-emitting devices of the set of light-emitting devices present in the camera view. However, the camera device may be arbitrarily located with respect to the plurality of light-emitting devices, as long as each of the light-emitting devices is distinguishable in the camera view. A camera device may preferably be a hand-held mobile camera device. The captured "image data" may be a continuously captured video.

In accordance to the invention, the light-emitting devices are "individually controllable" meaning that each of the light-emitting devices may independently be controlled to emit light. Moreover, the characteristics of the emitted light may be controlled independent from the other light-emitting devices in the plurality of light-emitting devices. The characteristics of the emitted light may for example be, intensity, wavelength, flashing period and/or frequency, etc. For example, the emitted light may be adjusted individually for at least one light-emitting device such that any UV component of the emitted light is reduced. Such UV light may be detrimental to the health of the staff in e.g. a greenhouse comprising the light-emitting devices. As an example, a mobile camera device may transmit information, such as current position, via e.g. W-LAN, to a control unit, to perform an action such as switching off or adjusting an UV light component in the appropriate sectors related to positions of light-emitting devices, determined by means of the invention, arranged in the greenhouse for protecting the staff member from a high exposure to UV light.

The term "planar grid arrangement" of light-emitting devices should be interpreted broadly. Thus, the grid may for example have any outer boundary shape such as, rectangular, circular, polygonal, etc. Furthermore, the grid pattern, thus the pattern of the grid lines of the grid arrangement, may or may not be parallel with the outer boundary of the layout of the grid arrangement.

A "set reference" in accordance with the invention is a reference related to a set of light-emitting devices. Furthermore, the set reference comprises a position of a light-emitting device which is part of the set of light-emitting devices. Moreover, the set reference may comprise a position of a randomly selected light-emitting device. Alternatively, or additionally, the set reference may comprise a position of a predetermined light-emitting device in the set of light-emitting devices.

In accordance with the invention, the term "unique network address" means that each light-emitting device in the grid arrangement of light-emitting devices may be individually addressed by for example a control unit regardless of whether the position of the light-emitting device, having a particular network address, is known or not. A unique network address may for example be a MAC-address or an IP-address related to a light-emitting device.

In accordance with the invention, light having "distinguishable properties" may be emitted. A distinguishable property may be a flashing period or sequence, a wavelength distribution, intensity, light-on-light-off, etc. By emitting light with distinguishable properties, a light-emitting device with a known unique network address may be identified among a set of light-emitting devices. Furthermore, code division multiple access (CDMA) or time division multiple access (TDMA) may be used for transmitting information related to a unique network address.

According to one embodiment of the invention, the method may comprise correlating the relative positions with a predefined layout of the planar grid, and determining absolute positions of each of the light-emitting devices in the set of light-emitting devices. In this way, the positions of the light-emitting devices may be determined relative an interior of a space where the light-emitting devices are arranged. For example, the light-emitting devices may be arranged in a greenhouse environment housing a plurality of plants. In such case, in order to ensure the correct lighting conditions for plants at certain locations within e.g. the greenhouse, the locations of the light-emitting devices in the greenhouse environment are advantageously known.

According to one embodiment of the invention, the set of light-emitting devices may comprise all the light-emitting devices of the plurality of light-emitting devices. In other words, all the light-emitting devices of the plurality of light emitting devices may be present in a single camera view.

According to one embodiment of the invention, the set reference may comprise positions of at least two light-emitting devices of the set of light-emitting devices. By allowing two positions of light-emitting devices to be a set reference a more accurate determination of the positions of the further light-emitting device is possible. For example, an unintended movement of the camera device may more accurately be compensated for when two or more reference positions have been established in the grid. The positions of the set reference may be relative positions. In one embodiment of the invention, the set of reference positions may comprise relative positions of four light-emitting devices.

According to one embodiment of the invention, the relative position of each light-emitting device in the set may be determined relative a constant set reference. In other words, the set reference is maintained through-out the determination of the relative positions of the light-emitting devices in a set of light-emitting devices. This is advantageous for example if all the light-emitting devices which positions are desired to determine (e.g. the plurality of light-emitting devices) are present in a single camera view.

According to one embodiment of the invention, the method may further comprise replacing the set reference. Replacing the set reference may be to replace all the related positions of the set reference with a completely new set. Alternatively, only one or several of the positions related to the set reference is replaced. For example, if the set reference comprises two positions, only one of the two positions may be replaced with a further position. Replacing the set reference is advantageous if the camera device is moved such that one or several of the set reference positions are outside the camera view and new set reference positions are needed for continued determination of positions of further light-emitting devices.

According to one embodiment of the invention, the method may comprise: acquiring further image data relating to a further camera view of a further set of light-emitting devices comprising at least one light-emitting device having a previously determined relative position, controlling a light-emitting device in the further set to emit light having a distinguishable property, wherein a relative position of the light-emitting device in the further set is determined relative the previously determined relative position. Thus, the camera device is moved from a first position to a second positions such that a further camera view is captured, in other words a panning action is performed with the camera device. The light-emitting device having a previously determined relative position may be considered to be part of a set reference when determining the relative locations of the light-emitting devices in the further set of light-emitting devices. Being able to move the camera such that it captures a further set of light-emitting devices and proceed with determining the locations of the light-emitting devices of the further set is advantageous for example when more than one camera view is necessary in order to capture all the light-emitting devices which positions are desired.

According to one embodiment of the invention, the method may comprise an initial determining of a set of outer boundary reference positions in the grid of light-emitting devices, the initial determining comprising the steps of:

determining positions of each of the light-emitting devices in the set reference; controlling a further light-emitting device to emit light having a distinguishable property; and determining a closest located light-emitting device of the set reference, being located closest to the further light-emitting device; wherein, if the further light-emitting device is at a distance further away from each of the light-emitting devices of the set reference except the position of the closest located light-emitting device, compared to a distance from the closest located light-emitting device to the other light-emitting devices of the set reference, replacing the closest located light-emitting device with the further light-emitting device in the set reference. In other words, the method according to the embodiment keeps finding light-emitting devices located further away from the previously located light-emitting devices. When the light-emitting device is identified which is located further away from all the other light-emitting devices except for the one closest to the identified light-emitting device, the identified light-emitting device replaces the light-emitting device closest to the identified light-emitting device in the set reference. In this way, an outer boundary of the set of light-emitting devices and/or the plurality of light-emitting devices may be determined. For example, if a grid layout of the light-emitting devices is known, outer corners or an outer grid circumference may be determined. This way, one may also determine the physical extension of the grid arrangement of light-emitting devices arranged for example in a greenhouse.

The steps for determining the outer boundary may be repeated for all light-emitting devices in the grid. In this way, the outer boundary is advantageously found in an efficient manner.

The relative positions may be stored in a database. Thereby, the relative positions of the light-emitting devices may be retrieved at a later stage, on demand when desired.

According to one embodiment of the invention, the method may comprise determining a location of the camera device relative the grid arrangement. For example, it may be advantageous to know from which direction (e.g. "north", "south", "east", "west", etc) the camera view is obtained. In this way, a more accurate determination of the positions of the light-emitting devices relative e.g. the interior of a building where the light-emitting devices are arranged may be obtained. For example, if the camera device is a hand-held device such as e.g. a camera device integrated in a mobile phone (e.g. a smart phone) a location of the camera device may be obtained directly from the mobile phone, either automatically if requested by a running algorithm or manually transmitted if needed at a later stage. Thereby, the direction (e.g. "north", "south", "east", "west", etc) from which the camera view is/was obtained may be determined.

According to second aspect of the present invention there is provided a system for determining positions of a plurality of light-emitting devices arranged in a planar grid arrangement, each light-emitting device being individually controllable, the system comprising:

a mobile camera device arranged to acquire image data, relating to a camera view of a set of the plurality of light-emitting devices, the mobile camera device being arbitrarily located with respect to the plurality of light-emitting devices in a way that each of the light-emitting devices in the set of light-emitting devices is distinct in the camera view; and a control unit configured to:
 a) establish a set reference in the set of light-emitting devices from the image data, wherein the set reference is related to a position of a light-emitting device in the camera view having a unique network address;
 b) control a further light-emitting device having a unique network address to emit light having a distinguishable property;
 c) receive image data relating to the camera view from the mobile camera device;
 d) from the image data, determine a relative position of the further light-emitting device with respect to the set reference, wherein the steps b)-d) are repeated until a relative position of each light-emitting device in the set of light-emitting devices has been determined.

According to one embodiment of the invention, the mobile camera device is a hand-held camera device remotely connected to the control unit.

The invention may advantageously be implemented in a greenhouse environment, the light-emitting devices being arranged to emit light towards plants in the greenhouse for stimulating growth of the plants.

Further effects and features of this second aspect of the present invention are largely analogous to those described above in connection with the first aspect of the invention.

According to a third aspect of the present invention there is provided a computer program product comprising a computer readable medium having stored thereon computer program means for executing the steps according to the first aspect and related embodiments of the invention.

Further effects and features of this third aspect of the present invention are largely analogous to those described above in connection with the previous aspects of the invention.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be considered as limited to the embodiments set forth herein; rather, these embodiments are provided for thoroughness and completeness, and fully convey the scope of the invention to the skilled addressee. Like reference characters refer to like elements throughout.

Figure 1:
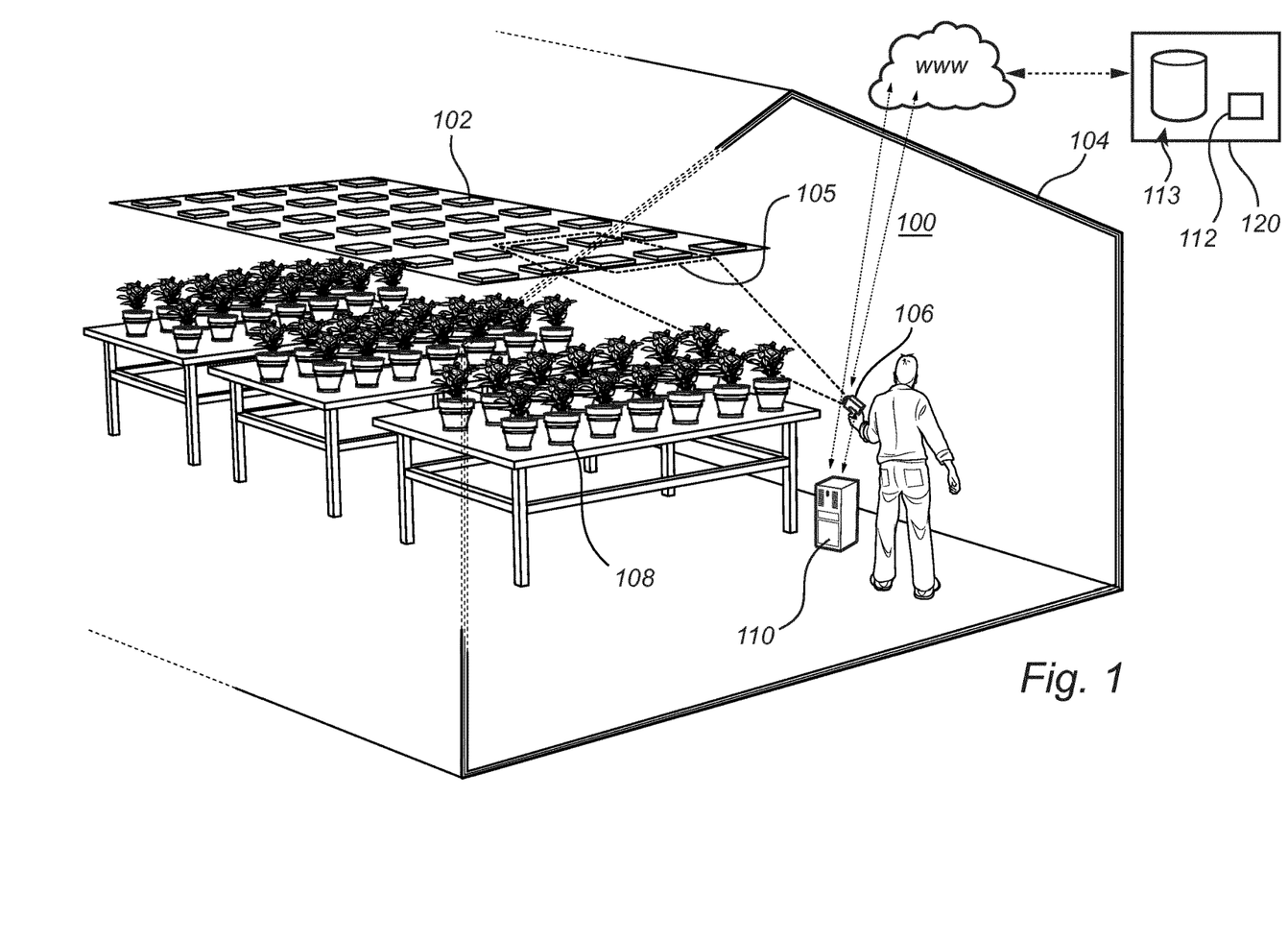
FIG. 1 shows an exemplary application of exemplary embodiments of the invention.

FIG. 1 shows an exemplary application for a system according to an embodiment of the invention. In FIG. 1 a system 100 for determining positions of a plurality of light-emitting devices 102 (only one is numbered in order to avoid cluttering in the drawing) is shown arranged in a controlled environment in the form of a greenhouse 104. Each of the light-emitting devices 102 is associated with a unique network address, for example a MAC-address, identifiable by a local control unit 110 and/or a control unit 112 remotely accessible via e.g. the internet. Moreover, the light-emitting devices 102 are arranged in a planar grid, in this case a rectangular grid. In this exemplary application, the light-emitting devices 102 are arranged to emit light towards a plurality of plants 108 (only one is numbered in order to avoid cluttering in the drawing) in the greenhouse 104 in order to stimulate growth of the plants 108. The system 100 comprises a camera device 106, in this case shown as a hand-held mobile camera device 106. The camera device 106 is configured to communicate with the local control unit 110 and/or a remote control unit 112, both arranged to control the light-emitting devices 102. The camera device 106 is preferably remotely connected to the local control unit 110 and/or the control unit 112 via wireless communication. Note that the camera device 106 may also be a stationary camera device and is thus not limited to a hand-held device as shown in FIG. 1. However, the camera device is preferably comprised in a mobile phone device (e.g. a "smartphone").

The camera device 106 is arranged to acquire image data related to a camera view 105 of a set of light-emitting devices captured in the camera view 105. The camera device 106 may be located at an arbitrary location relative the light-emitting devices as long as each of the light-emitting devices in the camera view 105 are distinguishable in the camera view 105. The control unit 110 and/or 112 is configured to distinguish the light-emitting devices in the camera view 105 using image processing.

The invention can be carried out within a local area network and local control units and applications. There are also advantages by using the Internet in combination with the local control unit. With a smartphone, a software application controlling the system 100 may be downloaded (e.g. from an "app-store") via the Internet to the smartphone 106. With the smartphone, a user may log on to (using a password and login information which could be included within the work order from the vendor of the system), and be in contact with, a central system 120 via the internet. The central system 120 may have stored on a server 113 information relating to the system 100 arranged in the greenhouse 104. For example, the central system may have access to information such as the MAC-addresses of the light-emitting devices 102. Furthermore, the light-emitting devices 102 may be controlled by the central system 120 via the control unit 112 and/or the local control unit 110. With the central system 120, implementation of position determination of the lighting-emitting devices 102 may be facilitated for a user since e.g. the instructions for a particular project (e.g. order from a client) may be stored online. Thereby, a user only needs to download the software application and the instructions from the central system 120 and execute a method according to an embodiment of the invention, using the Smartphone 106. The local control unit 110 could be instructed to poll (out-bound traffic) the server 113 during installation of the software application and therefore pass any firewalls blocking inbound traffic to the facilities (e.g. the greenhouse 104). When a method according to the invention is initiated from the smartphone 106, this is indicated by the control unit 112 to the local control unit 110, and the local control unit 110 downloads instructions and necessary applications from the central system 120 to execute the invention.

Figure 2:
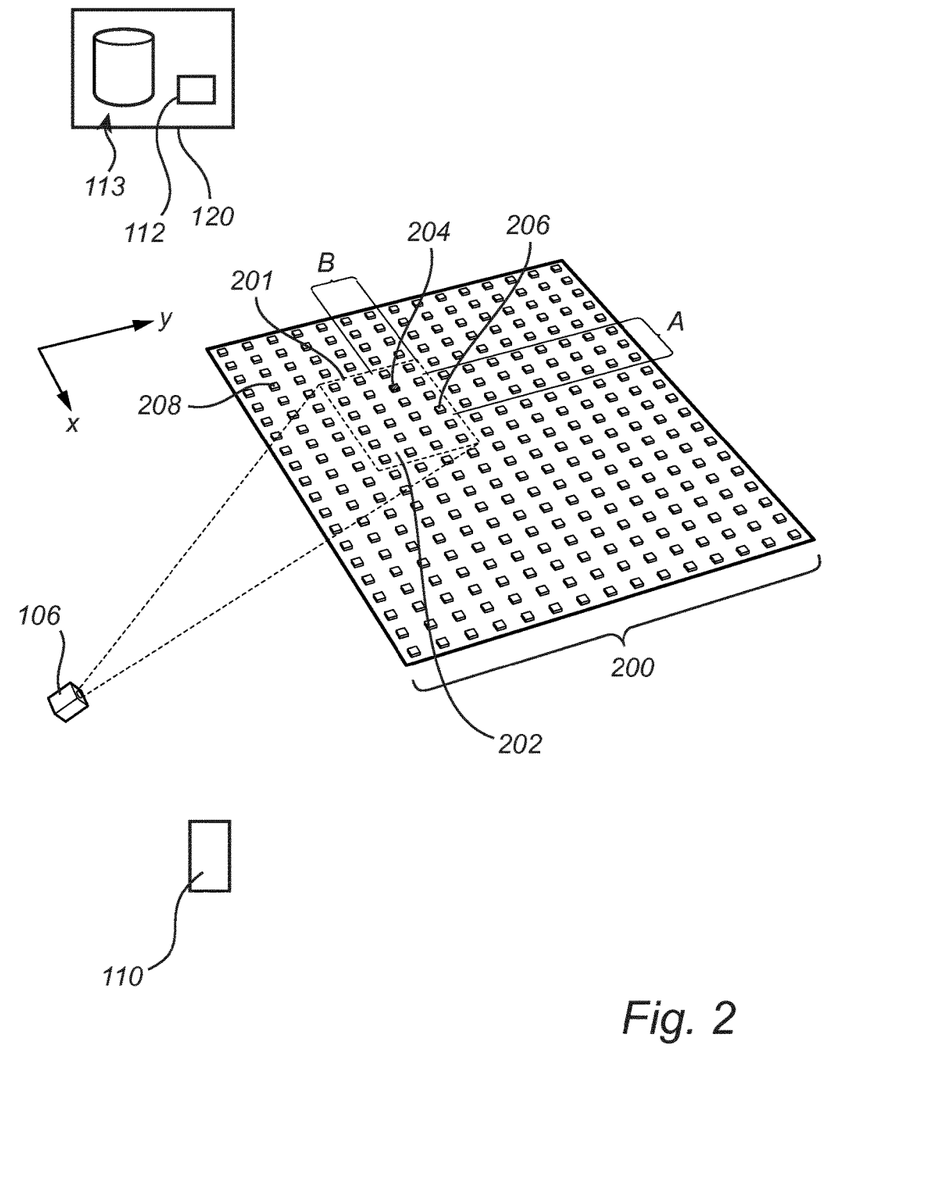
FIG. 2 schematically illustrates an exemplary embodiment of the invention.

FIG. 2 schematically illustrates a method according to an exemplary embodiment of the invention. In FIG. 2, a camera device 106 is in wireless communication with a control unit 110 and/or a remote control unit 112 similar to what is shown in FIG. 1. Furthermore, similar to what is depicted in FIG. 1, the camera device 106 is arranged to acquire image data related to a camera view 201 of a set 202 of light-emitting devices among a plurality of light-emitting devices 200. Furthermore, the control unit 110 and/or 112 is configured to establish a set reference 204 being a position of a light-emitting device 204 in the set 202 of light-emitting devices. Moreover, the set reference 204 may be established by controlling the light-emitting device 204, which may be randomly selected, to emit light having a distinguishable property such as flashing period or sequence, a wavelength, a light intensity, and/or a light-on-light-off distinguishing property. Furthermore, a distinguishable property may be transmitted using code division multiple access (CDMA) or time division multiple access (TDMA). The control unit 110 and/or 112 is configured to identify the distinguishable property and thereby also establish a set reference. If the randomly selected light-emitting device was not in the camera view 201, for example light-emitting device 208, the control unit 110 and/or 112 controls further light-emitting devices to emit light having a distinguishable property until at least one light-emitting device is distinguishable in the camera view 201. In a subsequent step, the control unit 110 and/or 112 controls a further light-emitting device 206 to emit light having a distinguishable property. Similar to the above, the control unit 110 and/or 112 controls a further light-emitting device until it may be distinguished in the set 202 of light-emitting devices related to the camera view 201. The control unit 110 and/or 112 determines the relative position of the further light-emitting device 206 relative the set reference 204. For example, if the position of the set reference 204 is (x1,y1), the relative position of the light-emitting device 206 is (x1+A, y1+B). In the manner described above, the control unit 110 and/or 112 determines the relative positions of all the light-emitting devices in the set of light-emitting devices 202 present in the camera view 201.

Furthermore, the set reference may comprise more than one position of light-emitting devices. In the above described embodiment, the position of one light-emitting device is used as a set-reference 204, thus the reference for the set of light-emitting devices 202. The set reference may for example be related to two, three, or more positions of light-emitting devices.

The camera device 106 may be located at an arbitrary location in relation to the grid arrangement of the plurality of light-emitting devices as long as each of the light-emitting devices in the camera view 201 is distinguishable in the camera view 201. However, in some situations it may be preferable to determine the location of the camera device, or at least from which direction (e.g. "north", "south", "east", "west", etc) the camera view is obtained. For example, the location of the camera device 106 may be advantageous to know in cases where the set reference 204 comprises the position of only one light-emitting device.

In FIG. 2, the camera view 201 captures a set 202 of light-emitting devices being part of a plurality 200 of light-emitting devices. However, if all the light-emitting devices of the plurality 200 of light-emitting devices are distinguishable in a single camera view, the set of light-emitting devices comprise all the light-emitting devices of the plurality 200 of light-emitting devices.

In the described method for determining the relative positions of light-emitting devices, the control unit 110 and/or 112 may correlate the relative positions with a pre-defined grid layout. For example, the control unit 110 and/or 112 may, as an initial input, have knowledge about the principal pattern of the grid arrangement of light-emitting devices. In FIG. 2, the pattern of the grid may for example be a rectangular pattern. Thus, the control unit 110 and/or 112 then knows what kind of pattern the relative positions of the light-emitting devices should follow. Note that the invention is not limited to rectangular grids but is equally applicable to e.g. circular, elliptical, or polygonal grids.

Figure 3:
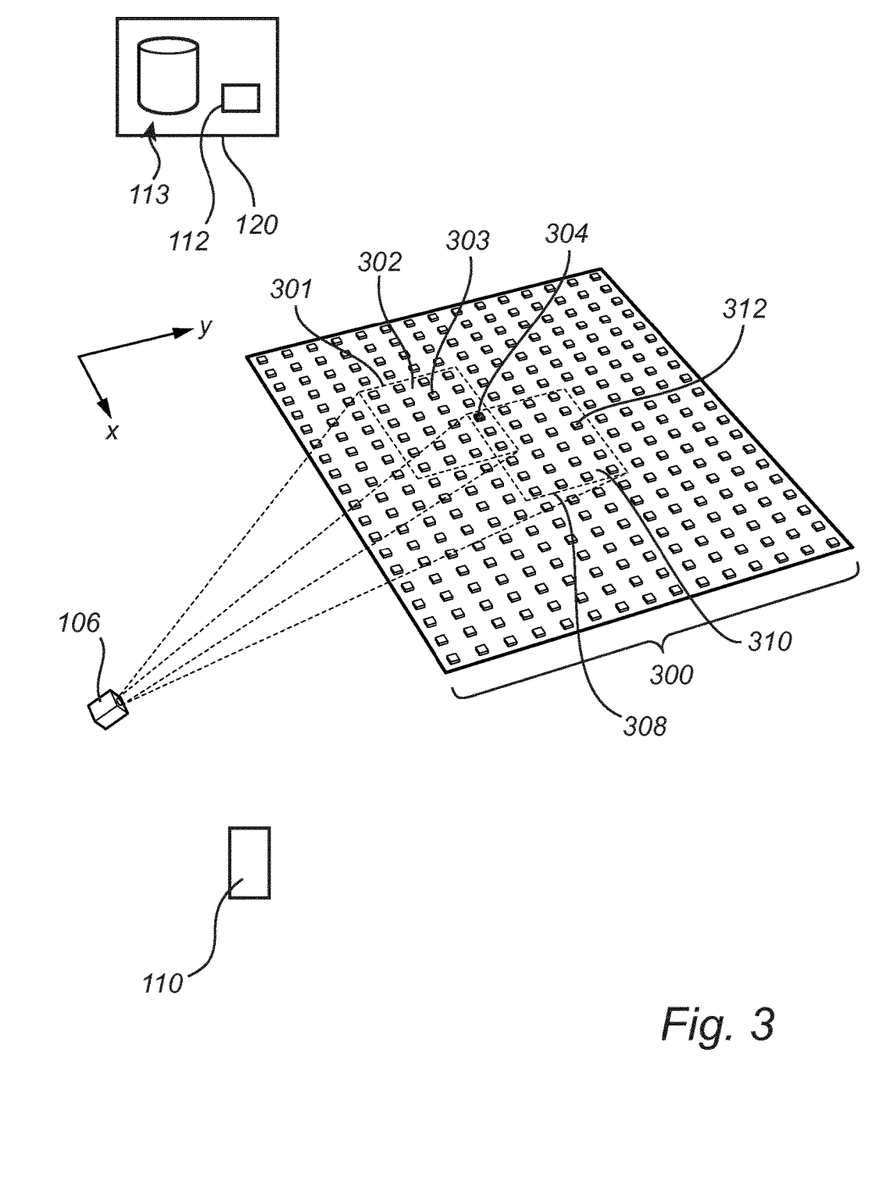
FIG. 3 schematically illustrates another exemplary embodiment of the invention.

FIG. 3 illustrates another exemplary method according to an embodiment of the invention. Similar to what was described with reference to FIG. 2, there is shown a camera device 106 remotely connected to a control unit 110 or 112. In FIG. 3, the camera device 106 has acquired image data related to a first camera view 301 and has determined the relative positions of at least one light-emitting device, in a set 302 of light-emitting devices. For example, the relative position of light-emitting devices 303, 304 may already have been determined relative a set reference in the first set 302 of light-emitting devices. The relative positions of light-emitting devices 303, 304 may have been determined in a manner similar to what was described with reference to FIG. 2.

In order to determine the relative positions of more light-emitting devices in a plurality of light-emitting devices 300 shown in FIG. 3, the camera device 106 acquires further image data relating to a further camera view 308 comprising a further set 310 of light emitting devices. In the further set 310 of light-emitting devices there is at least one light-emitting device 304 with a previously determined relative position. Subsequently, the control unit 110 and/or 112 controls a light-emitting device 312 in the further set 310 of light-emitting devices to emit light having a distinguishable property and proceeds to determine the relative position of the light-emitting device 312 relative the light-emitting device 304 with a previously determined relative position. In other words, the light-emitting device 304 with a previously determined relative position may in this case become the set reference for the further set 310 of light-emitting devices. Thereby, following the method described with reference to FIG. 2, the relative positions of the light-emitting devices in both sets 302, 310 may be determined. Moreover, by acquiring even further image data relating to even further sets of light-emitting devices, the relative positions of all the light-emitting devices of the plurality 300 of light-emitting devices may be determined. Capturing several camera views (e.g. 301 and 308) in order to acquire more than one image data set is practically performed by panning the plurality of light-emitting devices 300 with the camera device 106.

The control unit 110 preferably comprises a storage unit for storing the relative positions of the light-emitting devices. Alternatively, the control unit 112 may be part of a central system 120 comprising a server 113 for storing e.g. relative positions of the light-emitting devices.

In some situations it may be desirable to determine the absolute positions of the light-emitting devices in a planar grid arrangement. In particular, it may be desirable to determine the outer boundary of the grid arrangement. Thereby, it is possible to determine the position of each light-emitting device in relation to an interior of the location where the light-emitting devices are arranged. For example, it may be desirable to determine the position of the light-emitting devices in relation to plants arranged in a greenhouse 104 in order to better adjust the light-settings of light-emitting devices emitting light towards plants in need of a particular light property (e.g. intensity or wavelength distribution).

Figure 4:
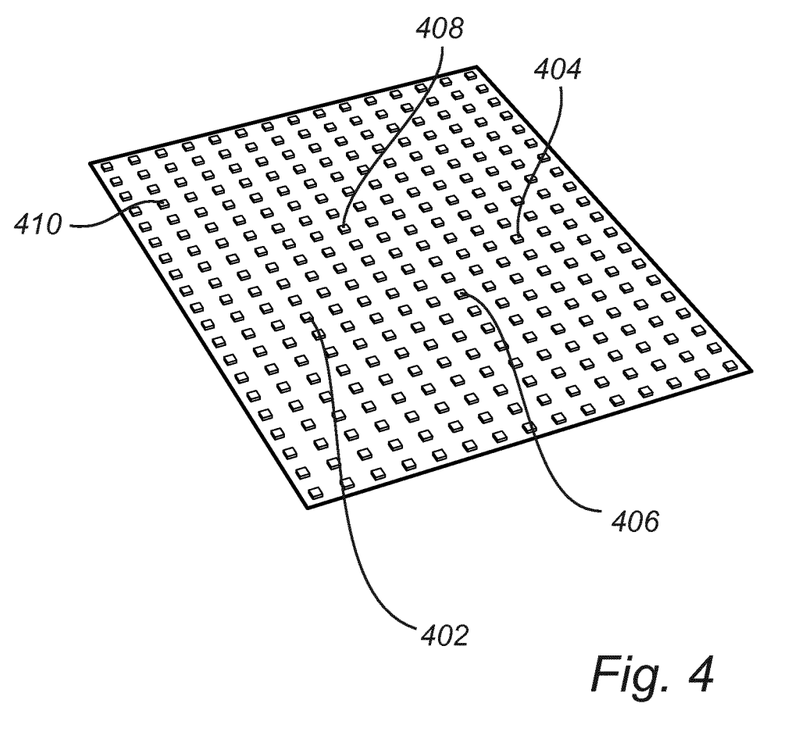
FIG. 4 schematically illustrates yet an exemplary embodiment of the invention.

The outer boundary of a grid may be determined in a way described with reference to FIG. 4. First, a set of reference positions are determined, in the example shown in FIG. 4, the positions of four light-emitting devices 402, 404, 406, 408 are the set reference. Subsequently, a further light-emitting device 410 is controlled to emit light and the relative position of the further light-emitting device 410 relative the set reference 402, 404, 406, 408 is determined. Then the light-emitting device closest to the further light-emitting device 410 is determined, in this example the closest light-emitting device is light-emitting device 408. In a subsequent step it is determined whether the further light-emitting device 410 is located at a larger distance from each of the light-emitting devices of the set reference 402, 404, 406, excluding the closest light-emitting device 408, compared with the closest light-emitting device 408. If the further light-emitting device 410 is located at a larger distance, compared with the closest light emitting device 408, from each of the light-emitting devices of the set reference 402, 404, 406, then the further light-emitting device 410 replaces the closest light-emitting device 408 in the set reference. Thus, the new set reference comprises the positions of light-emitting devices 402, 404, 406, and 410. The method described with reference to FIG. 4 is preferably repeated for each of the light-emitting devices as a further light-emitting device.

Moreover, in the above exemplary embodiments, if needed, a set reference may be replaced with a new set reference without compromising the functionality of the methods. For example, a user holding a hand-held camera device may unintentionally move the camera device such that a set reference falls outside the camera view. In such case, the set reference which is now outside the camera view, may be replaced by a new set reference being the position of a light-emitting device present in the camera view. After the new set reference is selected, the determination of positions of light-emitting device may continue.

Figure 5:
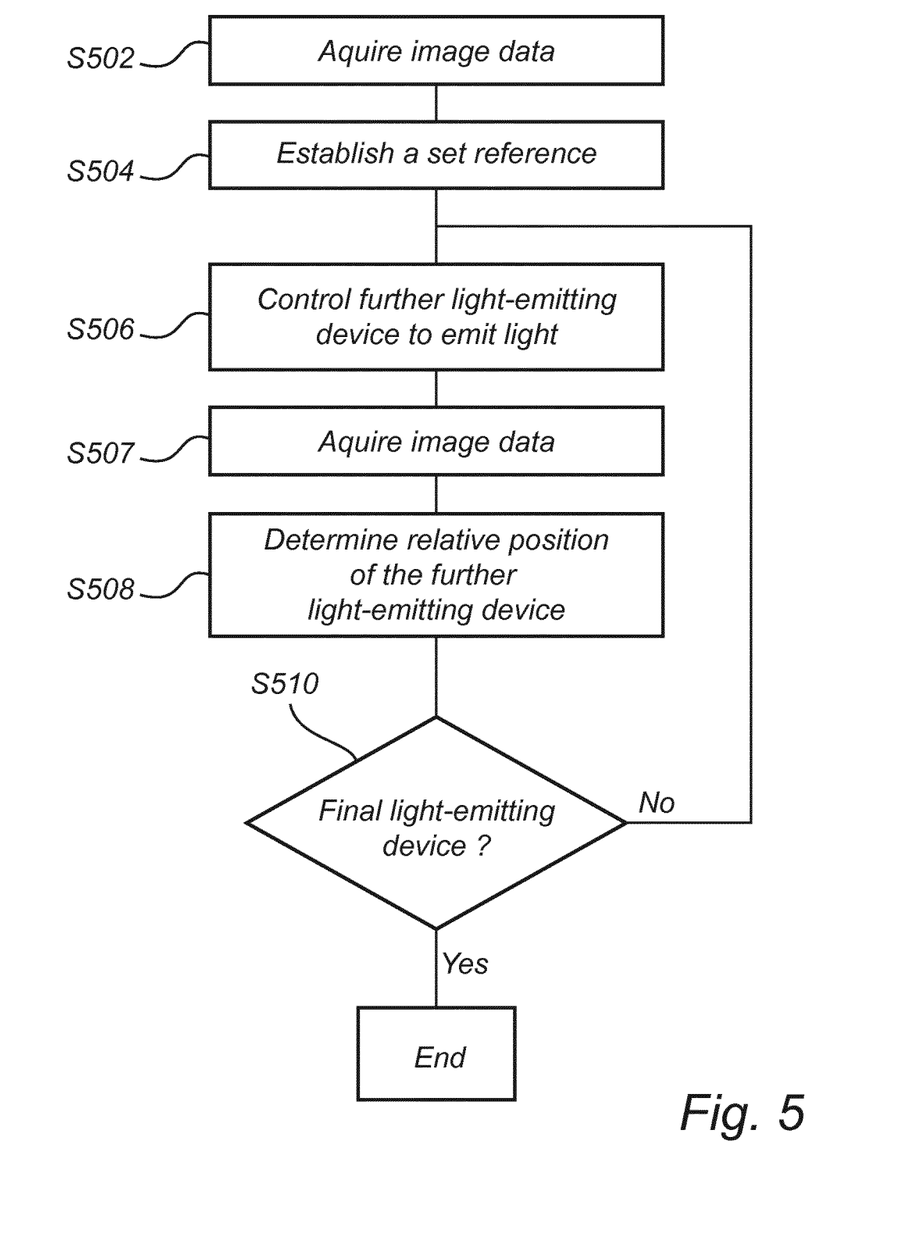
FIG. 5 provides a flow chart of the method steps according to an embodiment of the invention.

FIG. 5 provides a flow-chart describing a method according to an exemplary embodiment of the invention. In a first step S502, a camera device acquires image data relating to a camera view of a set of light-emitting devices. The camera device may be arbitrarily located with respect to the light-emitting devices as long as each of the light-emitting devices in the set is distinct in the camera view. In a subsequent step S504 a set reference is established in the set of light-emitting devices from the image data. The set reference is related to a position of a light-emitting device in the camera view having a unique network address identifiable by a control unit. In step S506 a further light-emitting device having a unique network address is controlled to emit light having distinguishable properties. The distinguishable properties may for example be a flashing period or sequence, a wavelength. Furthermore, the light having a distinguishable property may be transmitted using code division multiple access (CDMA) or time division multiple access (TDMA). In step S507, the camera device again acquires image data relating to the camera view. Subsequently S508, the relative position of the further light-emitting device is determined with respect to the set reference. Steps S506-S508 are repeated until a relative position of each light-emitting device in the set of light-emitting devices has been determined.

Figure 6:
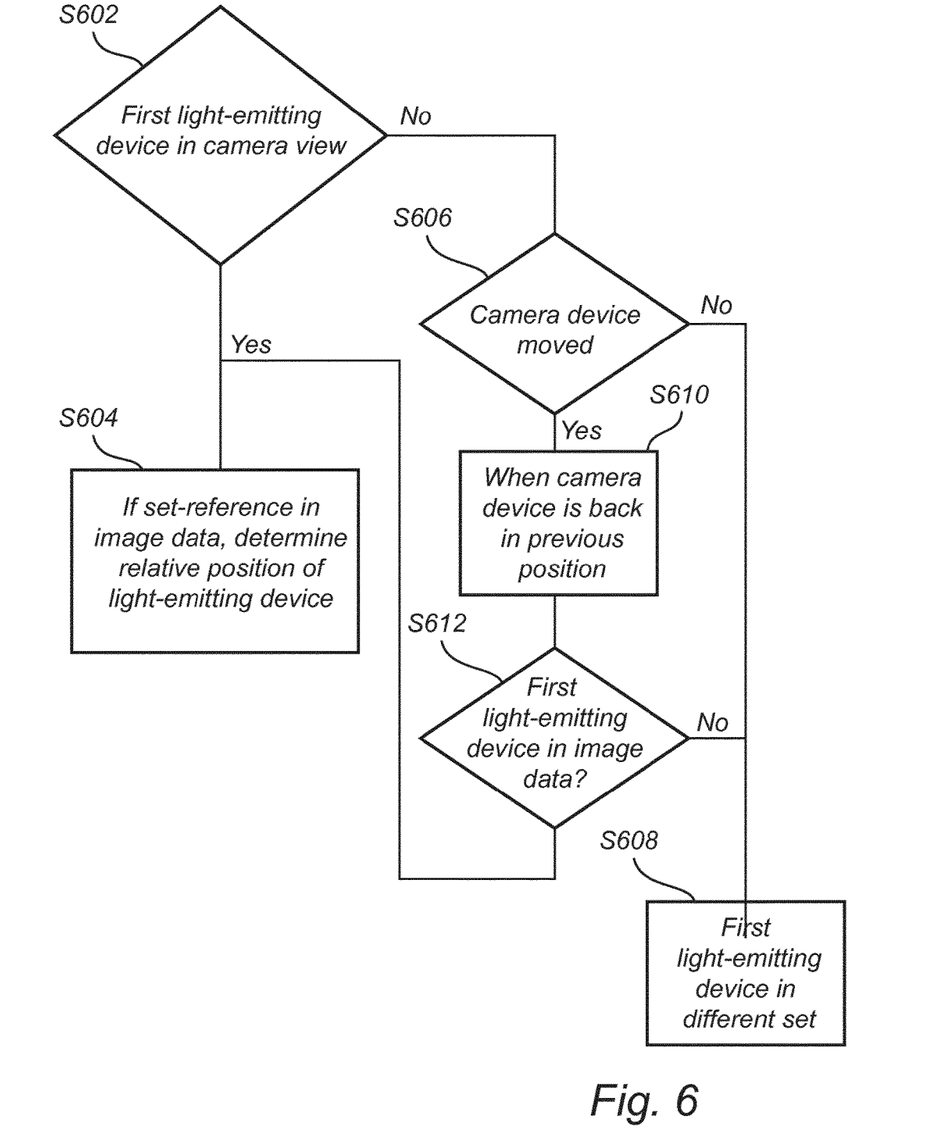
FIG. 6 provides a flow chart of the method steps according another embodiment of the invention.

It may occur that the camera device 106 is moved during a process of determining the positions of light-emitting devices 102. It may for example be difficult for a user to maintain still when having the camera device pointed towards the plurality of light-emitting devices 102. In such case, a situation may appear that a set reference or a light-emitting device emitting light having distinguishable properties is outside the camera view. FIG. 6 provides a flow-chart illustrating exemplary method steps, handling with such situation. In FIG. 6, it is determined in step S602 whether a first light-emitting device is present in a camera view. If the first light-emitting device is present in the camera view, a relative position of the first light-emitting device may be determined in step S604 relative a set reference (as previously described), provided that the set reference (or at least one set reference) is also present in the camera view. However, if the first light-emitting device is not present in the camera view, it may be determined in step S606 whether the camera device has been moved. This determination may be done by determining a displacement of the position(s) of a set reference(s) in the camera view compared to the position(s) of the set reference(s) in a previous camera view. If it is determined in step S606 that the camera device had not been moved, it may be that the light-emitting device is not part of the present set of light-emitting devices if the set reference is present in the camera view, as indicated in step S608.

If the camera had been moved, for example as a result of an unintentional movement of the camera device, it may again be determined whether the light-emitting device is present in the camera view in step S612. However, the step S612 may be performed after that the camera device has returned, as indicated in step S610, to the previous location where the camera device was located before the camera device was moved. The returning of the camera device to the previous location may be done via another unintentional movement, or via a guiding function controlled by the control unit 110 and/or 112. The method steps shown in FIG. 6 may be executed concurrently or sequentially with the previously described methods presented with reference to FIGS. 2-5. After the camera device has returned to the previous positing and if the first light-emitting device is present in the image data, the relative position of the first light-emitting device may be determined in step S604 as previously described. If the light-emitting device is not in the image data in step S612 it may be determined that the first light-emitting device is in a different set of light-emitting devices.

In the above described embodiments, the acquired image data may be part of a continuously captured video acquired by the camera device. Thus, methods according to embodiments of the invention may be in part performed by simply pointing the camera device towards the light-emitting devices and transmitting the image data as a video to a control unit.

Furthermore, in the described embodiments, a camera device captures the image data as shown in the drawings. The method steps according to embodiments of the invention may be performed by a control unit located remotely with respect to the camera device, or the method steps may be performed by a control unit located within the camera device, for example if the camera device is a laptop or a smartphone comprising a control unit. The camera device (thus, the laptop or smartphone) may in that case be configured to control the light-emitting devices.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The control unit is preferably a micro processor or any other type of computing device. Similarly, the computer readable medium may be any type of memory device, including one of a removable nonvolatile/volatile random access memory, a hard disk drive, a floppy disk, a CD-ROM, a DVD-ROM, a USB memory, an SD memory card, or a similar computer readable medium known in the art.

The expression "controlled environment" should be interpreted broadly, including for example a greenhouse, or similar controlled growth environment where the plants may be subject to at least illumination of natural light. The controlled environment is thus typically an "indoor environment" comprising a transparent window or similar for allowing external light (such as natural light from the sun) to be received by the plants. However, the invention is not limited to the use in a greenhouse environment but may be used in any setting where the positions of light-emitting devices may be advantageous.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for determining positions of a plurality of light-emitting devices arranged in a planar grid arrangement, each light-emitting device being individually controllable and having a unique network address, said method comprising the steps of:
   a) providing a camera device arbitrarily located with respect to said plurality of light-emitting devices in a way that each of the light-emitting devices in a set of said plurality of light-emitting devices is distinct in a camera view captured by said camera device;
   b) acquiring image data, relating to said camera view of said set of said plurality of light-emitting devices;
   c) establishing a set reference in said set of light-emitting devices from said image data, wherein said set reference is related to a position of a light-emitting device in said camera view;
   d) controlling a further light-emitting device having a unique network address to emit light having a distinguishable property;
   e) determining a relative position of said further light-emitting device with respect to said set reference,
   wherein the steps b), d)-e) are repeated until a relative position of each light-emitting device in said set of light-emitting devices has been determined.

2. The method according to claim 1, comprising correlating said relative positions with a predefined layout of said planar grid, and
   determining absolute positions of each of said light-emitting devices in said set of light-emitting devices.

3. The method according to claim 1, wherein said set of light-emitting devices comprises all the light-emitting devices of said plurality of light-emitting devices.

4. The method according to claim 1, wherein said set reference comprises positions of at least two light-emitting devices of said set of light-emitting devices.

5. The method according to claim 1, wherein said set of reference positions comprise relative positions of four light-emitting devices.

6. The method according to claim 1, wherein the relative position of each light-emitting device in said set is determined relative to a constant set reference.

7. The method according to claim 1, further comprising replacing said set reference.

8. The method according to claim 1, comprising:
   acquiring further image data relating to a further camera view of a further set of light-emitting devices comprising at least one light-emitting device having a previously determined relative position,
   controlling a light-emitting device in said further set to emit light having a distinguishable property, wherein a relative position of said light-emitting device in said further set is determined relative to said previously determined relative position.

9. The method according to claim 1, comprising an initial determining of a set of outer boundary reference positions in said grid of light-emitting devices, said initial determining comprising the steps of:
   determining positions of each of the light-emitting devices in said set reference;
   controlling a further light-emitting device to emit light having a distinguishable property; and
   determining a closest located light-emitting device of said set reference, being located closest to said further light-emitting device;
   wherein, if said further light-emitting device is at a distance further away from each of the light-emitting devices of said set reference except the position of said closest located light-emitting device, compared to a distance from said closest located light-emitting device to the other light-emitting devices of said set reference, replacing said closest located light-emitting device with said further light-emitting device in said set reference.

10. The method according to claim 9, wherein the steps for determining the outer boundary is repeated for all light-emitting devices in said grid.

11. The method according to claim 1, comprising determining a location of said camera device relative to said grid arrangement.

12. A system for determining positions of a plurality of light-emitting devices arranged in a planar grid arrangement, each light-emitting device being individually controllable, said system comprising:
    a mobile camera device arranged to acquire image data, relating to a camera view of a set of said plurality of light-emitting devices, said mobile camera device being arbitrarily located with respect to said plurality of light-emitting devices in a way that each of the light-emitting devices in said set of light-emitting devices is distinct in said camera view; and
    a control unit configured to:
      a) establish a set reference in said set of light-emitting devices from said image data, wherein said set reference is related to a position of a light-emitting device in said camera view having a unique network address;
      b) control a further light-emitting device having a unique network address to emit light having a distinguishable property;
      c) receive image data relating to said camera view from said mobile camera device;
      d) from said image data, determine a relative position of said further light-emitting device with respect to said set reference,
    wherein the control unit is further configured to repeat steps b)-d) until a relative position of each light-emitting device in said set of light-emitting devices has been determined.

13. The system according to claim 12, wherein said mobile camera device is a hand-held camera device remotely connected to said control unit.

14. The system according to claim 12, wherein said control unit is configured to determine a location of said mobile camera device relative to said grid.

15. A greenhouse system comprising:
    a plurality of light-emitting devices, said light-emitting devices being arranged to emit light towards plants arranged in a greenhouse for stimulating growth of said plants, and
    a system according to claim 12.

* * * * *